(12) United States Patent
Yoo (10) Patent No.: US 9,306,409 B2
(45) Date of Patent: Apr. 5, 2016

(54) METHOD OF MEASURING VOLTAGE OF BATTERY PACK AND ENERGY STORAGE SYSTEM INCLUDING THE BATTERY PACK

(71) Applicant: Samsung SDI Co., Ltd., Yongin-si, Gyeonggi-Do (KR)

(72) Inventor: Hwan-Sung Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 419 days.

(21) Appl. No.: 13/842,239

(22) Filed: Mar. 15, 2013

(65) Prior Publication Data

US 2014/0035365 A1 Feb. 6, 2014

(30) Foreign Application Priority Data

Aug. 6, 2012 (KR) ........................ 10-2012-0086002

(51) Int. Cl.
*H02J 7/00* (2006.01)
*H02J 17/00* (2006.01)
*H02J 3/32* (2006.01)
*H02J 13/00* (2006.01)

(52) U.S. Cl.
CPC . *H02J 7/007* (2013.01); *H02J 3/32* (2013.01); *H02J 7/0022* (2013.01); *H02J 13/0075* (2013.01); *H02J 17/00* (2013.01); *Y02E 60/722* (2013.01); *Y04S 10/14* (2013.01); *Y10T 307/305* (2015.04)

(58) Field of Classification Search
None
See application file for complete search history.

(56) References Cited

U.S. PATENT DOCUMENTS

| | | | |
|---|---|---|---|
| 8,228,040 B2 * | 7/2012 | Utsumi et al. | 320/136 |
| 2007/0123316 A1 | 5/2007 | Little | |
| 2008/0129247 A1 * | 6/2008 | Lee et al. | 320/134 |
| 2010/0262312 A1 | 10/2010 | Kubota et al. | |
| 2011/0140527 A1 * | 6/2011 | Choi | 307/76 |
| 2013/0271072 A1 * | 10/2013 | Lee et al. | 320/108 |

FOREIGN PATENT DOCUMENTS

| | | |
|---|---|---|
| JP | 2011-203595 A | 10/2011 |
| KR | 10-2008-0066798 (A) | 7/2008 |
| KR | 10-2008-0099078 A | 11/2008 |
| KR | 10-2011-0087639 A | 8/2011 |
| KR | 10-2012-0005450 A | 1/2012 |
| WO | WO 2012/061262 A1 | 5/2012 |

* cited by examiner

*Primary Examiner* — Leigh Garbowski
(74) *Attorney, Agent, or Firm* — Knobbe, Martens, Olson & Bear, LLP (57) ABSTRACT

A battery system comprising a battery management system (BMS) is disclosed. The BMS has a hierarchical structure including an upper layer master BMS and a lower layer slave BMS. The master transmits a request signal to the slave wirelessly, and the slave transmits a response signal based on the request signal wirelessly to the master.

17 Claims, 6 Drawing Sheets

METHOD OF MEASURING VOLTAGE OF BATTERY PACK AND ENERGY STORAGE SYSTEM INCLUDING THE BATTERY PACK

CROSS-REFERENCE TO RELATED APPLICATIONS

This application claims the benefit of Korean Patent Application No. 10-2012-0086002, filed on Aug. 6, 2012, in the Korean Intellectual Property Office, the disclosure of which is incorporated herein in its entirety by reference.

BACKGROUND

1. Field

The disclosed technology relates to a method of measuring a voltage of a battery pack and an energy storage system including the battery pack.

2. Description of the Related Technology

As environmental destruction continues, depletion of resources becomes problematic, and so a system for efficiently storing power and using stored power is increasingly drawing attention. Renewable energy that does not generate pollution is also drawing much attention. An energy storage system links renewable energy, a power storing battery, and conventional system power, and there has been much research and development corresponding to changes in the present environment.

In the energy storage system, efficient management of a battery is important. A battery needs to be managed with respect to various factors such as charge, discharge, cell balancing, etc. The life of a battery may be extended through the efficient management thereof. Also, power may be stably supplied to a load.

A battery system monitors its own inner state to ensure stable operation, and collects data measured through such monitoring. In this regard, the battery system includes a variety of battery management units having a master and slave structure. Battery management units corresponding to slaves transmit the measured data to a battery management unit corresponding to a master. The battery management unit corresponding to the master receives and collects all of the data.

SUMMARY OF CERTAIN INVENTIVE ASPECTS

One inventive aspect is a battery system including a battery management system (BMS). The BMS has a hierarchical structure with an upper layer BMS and a lower layer BMS, where the upper layer BMS is a master and the lower layer BMS is a slave. The master transmits a request signal to the slave wirelessly, and the slave transmits a response signal based on the request signal wirelessly to the master.

Another inventive aspect is a battery system including a battery management system (BMS). The BMS has a hierarchical structure including an upper layer BMS and a plurality of lower layer BMSs, where the upper layer BMS is a master and one or more of the lower layer BMSs are slaves. The master is configured to substantially simultaneously transmit a request signal to the slaves wirelessly, and the slaves are configured to transmit response signals based on the request signal wirelessly.

Another inventive aspect is an energy storage system including a power conversion unit configured to convert a voltage generated by a power generation system into a DC voltage, a bidirectional inverter configured to convert the DC voltage into an AC voltage and to convert another AC voltage into a DC voltage, and a battery system including a battery module including a set of batteries having a hierarchical structure. The battery system also includes a set of BMSs configured to control charging and discharging of the battery module and having a hierarchical structure corresponding to the hierarchical structure of the batteries. The energy storage system also includes an integrated controller for charging the batteries, discharging the batteries, and controlling the power conversion unit, the bidirectional inverters, a bidirectional inverter, and the battery system so as to supply power to a load and a grid. An upper layer BMS is a master and a lower layer BMS is slave, where the master is configured to transmit a Zigbee based wireless request signal to the slave, and the slave is configured to transmit a Zigbee based wireless response signal based on the Zigbee based wireless request signal.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION OF THE PREFERRED EMBODIMENT

Various aspects are described more fully with reference to the accompanying drawings, in which exemplary embodiments are shown. The embodiments are described in detail such that one of ordinary skill in the art may make and use the described aspects. It should be understood that the disclosed embodiments may vary but do not have to be mutually exclusive. For example, particular shapes, structures, and properties according to a first embodiment described in this specification may be modified with aspects of other embodiments. In addition, positions or arrangement of individual components of each of the embodiments may also be modified without departing from the spirit and scope of the present invention. Accordingly, the detailed description below should not be construed as having limited meanings but construed to encompass the scope of the claims and any equivalent ranges thereto. In the drawings, like reference numerals generally denote like elements in various aspects.

Hereinafter, various features are described in detail by explaining certain embodiments with reference to the attached drawings. As used herein, the term "and/or" includes any and all combinations of one or more of the associated listed items.

Figure 1:
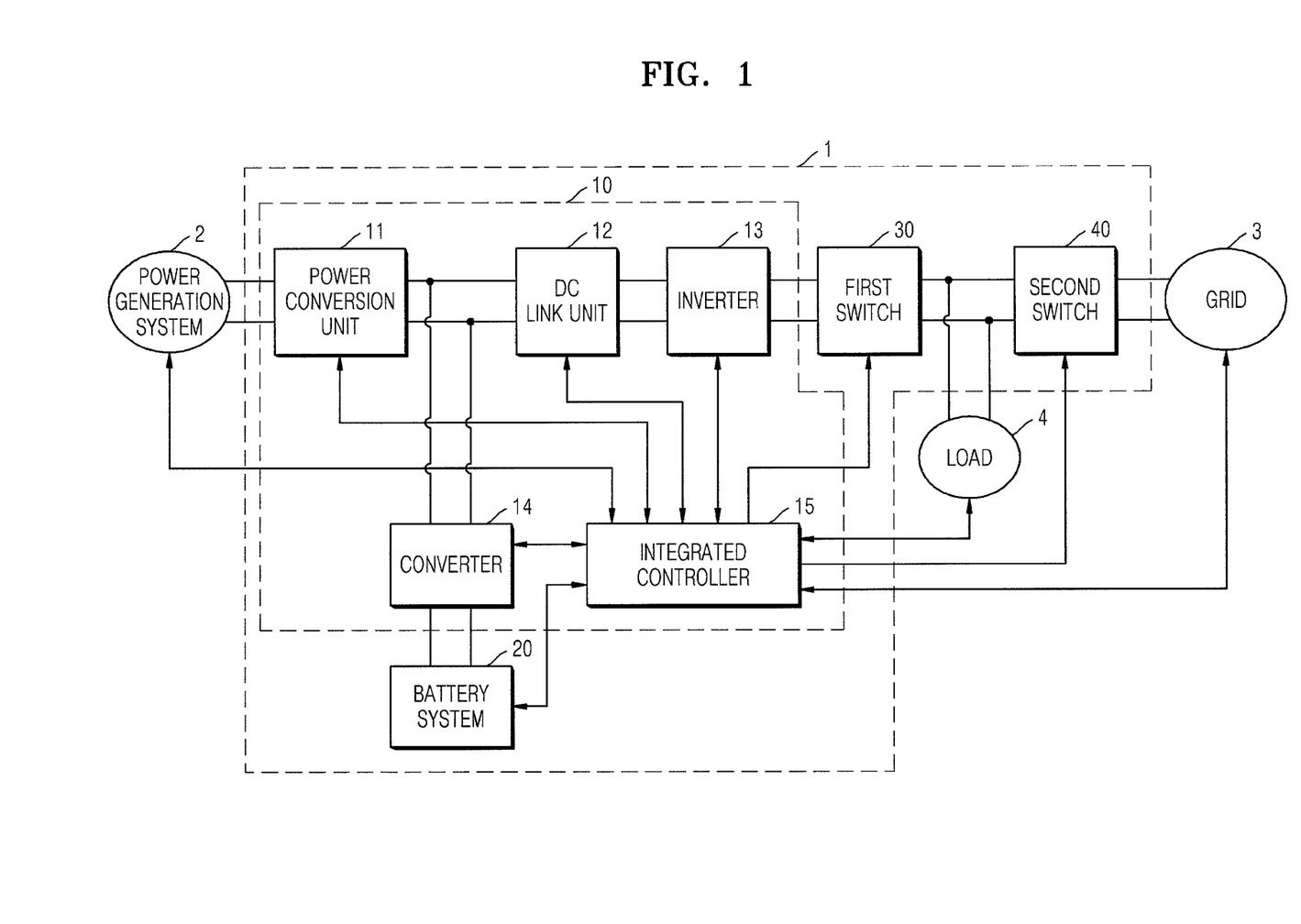
FIG. 1 is a block diagram illustrating an energy storage system according to an embodiment.

FIG. 1 is a block diagram illustrating an energy storage system 1 according to an embodiment. Referring to FIG. 1, the energy storage system 1 supplies power to a load 4 in collaboration with a power generating system 2, and a grid 3.

The power generating system 2 generates power by using an energy source. The power generating system 2 supplies generated power to the energy storage system 1. The power generating system 2 may be, for example, a solar photovoltaic power system, a wind power system, a tidal power system, etc. However, this is exemplary and the power generating system 2 is not limited to the above-mentioned systems. The power generating system 2 may include any power systems capable of generating power by using renewable energy such as solar heat or ground heat. In particular, a solar system that produces electrical energy by using solar light may be easily installed at home or in a factory, and may be easily applied to the energy storage system 1 distributed at home or factory. The power generating system 2 includes a plurality of power generation modules in parallel and produces power for each power generation module, thus constituting a mass-storage energy system.

The grid 3 includes, for example, a power plant, a power substation, a power cable, etc. When the grid 3 is in a normal state, the grid 3 supplies power to the energy storage system 1 so that the power may be supplied to the load 4 and/or a battery system 20. In addition, the grid 3 may receive power from the energy storage system 1. When the grid 3 is in an abnormal state, the power supply from the grid 3 to the energy storage system 1 is discontinued and the power supply from the energy storage system 1 to the grid 3 is also discontinued.

The load 4 consumes power generated by the power generating system 2, power stored in a battery system 20, or the power supplied from the grid 3. A home or factory may be an example of the load 4.

The energy storage system 1 may store the power generated by the power generating system 2 in the battery 10 and supply generated power to the grid 3. Also, the energy storage system 1 may supply the power stored in the battery 10 to the grid 3 or the power supplied from the grid 3 to the battery 10. Also, when the grid 3 is in an abnormal state, for example, when a blackout occurs, the energy storage system 1 may perform an uninterruptible power supply (UPS) operation to supply power to the load 4. Also, when the grid 3 is in a normal state, the energy storage system 1 may supply the power generated by the power generating system 2 or the power stored in the battery 10 to the load 4.

The energy storage system 1 includes a power control system (PCS) 10 for controlling conversion of power, a battery system 20, a first switch 30, and a second switch 40.

The PCS 10 converts the power of the power generating system 2, the grid 3, and the battery system 20 to appropriate power and supplies the power to where it is intended. The PCS 10 includes a power conversion unit 11, a DC link unit 12, an inverter 13, a converter 14, and an integrated controller 15.

The power conversion unit 11 is connected between the power generating system 2 and the DC link unit 12. The power conversion unit 11 transmits the power generated by the power generating system 2 to the DC link unit 12 by converting an output voltage to a DC link voltage.

The power conversion unit 11 may be a power conversion circuit of a converter or a rectifier circuit according to a type of the power generating system 2. In a case where the power generating system 2 generates a direct current, the power conversion unit 11 may be the converter for converting the direct current of the power generating system 2 into the direct current of the DC link unit 12. In a case where the power generating system 2 generates an alternating current, the power conversion unit 11 may be the rectifier circuit for converting the alternating current of the power generating system 2 into the direct current of the DC link unit 12. In particular, if the power generating system 2 is a solar photovoltaic power system, the power conversion unit 11 may include a maximum power point tracking (MPPT) converter for performing MPPT control to obtain the maximum power generated by the power generating system 2 according to a change in solar irradiance, temperature, etc. If the power generating system 2 does not generate power, the power conversion unit 11 may stop operating and minimize power consumed by the converter.

The DC link voltage may become unstable due to, for example, an instantaneous voltage drop in the power generating system 2 or the grid 3, or generation of a demand spike in the load 4. However, the DC link voltage may be beneficially stabilized for normal operations of the converter 14 and the inverter 13. The DC link unit 12 is connected between the power conversion unit 11 and the inverter 13 and maintains a constant DC link voltage. The DC link unit 12 may include, for example, a capacitor having a large capacity.

The inverter 13 is a power converter that is connected between the DC link unit 12 and the first switch 30. The inverter 13 may include an inverter for converting a DC link voltage carrying power output from the power generating system 2 and/or the battery system 20 to an AC voltage of the grid 3 and outputs the converted voltage in a discharge mode. Also, the inverter 13 may include a rectifier circuit for rectifying the AC voltage of the grid 3, converting the AC voltage to a DC link voltage, and outputting the converted voltage, to store the power of the grid 3 in the battery system 20 in a charge mode. Accordingly, the inverter 13 may be a bidirectional inverter in which input and output directions may change.

The inverter 13 may include a filter for removing harmonics from the AC voltage output to the grid 3. Also, the inverter 13 may include a PLL circuit for synchronizing a phase of the AC voltage output from the inverter 13 and a phase of the AC voltage of the grid 3 in order to restrict generation of reactive power. In addition, the inverter 13 may perform functions of limiting a voltage regulation range, improving a power factor, removing a DC component, protecting a transient phenomenon, etc. The inverter 13 may stop operating so as to minimize power consumption when not used.

The converter 14 is a power conversion apparatus connected between the DC link unit 12 and the battery system 20. The converter 14 includes a converter for DC-DC converting the voltage stored in the battery system 20 to a voltage level needed by the inverter 13, that is, the DC link voltage, and outputting the converted voltage, in a discharge mode. Also, the converter 14 includes a converter for DC-DC converting the voltage output from the power conversion unit 11 or a voltage of the power output from the inverter 13 to a voltage level used by the battery system 20, that is, a charge voltage, in a charge mode. Accordingly, the converter 14 may be a bidirectional inverter in which input and output directions may change. The converter 14 may stop operating so as to minimize power consumption when the battery system 20 does not need charging or discharging.

The integrated control unit 15 monitors states of the power generating system 2, the grid 3, the battery system 20, and the load 4 and controls the power conversion unit 11, the inverter 13, the converter 14, the battery system 20, the first switch 30, and the second switch 40 according to a result of the monitoring and an algorithm. The integrated control unit 15 may monitor, for example, whether a blackout occurs in the grid 3, whether the power generating system 2 generates power, if the power generating system 2 generates power, a power generation amount of the power generating system 2, a charge state of the battery system 20, a power consumption amount of the load 4, time, etc. Also, if power to be supplied to the load 4 is not sufficient, for example, when a blackout occurs in the grid 3, the integrated control unit 15 may determine priorities of devices that use power included in the load 4, and control the load 4 to supply the power to the device that uses power having a highest priority.

The first switch 30 and the second switch 40 are serially connected between the inverter 13 and the grid 3 and control a flow of current between the power generating system 2 and the grid 3 by performing on/off operations according to control of the integrated control unit 14. The on/off of the first switch 30 and the second switch 40 may be determined according to the states of the power generating system 2, the grid 3, and the battery system 20.

More specifically, in a case where power of the power generation system 2 and/or the battery system 20 is supplied to the load 4 or power of the load 4 is supplied to the battery system 20, the first switch 30 is set to an ON state. In a case where power of the power generation system 2 and/or the battery system 20 is supplied to the grid 3 or power of the grid 3 is supplied to the load 4 and/or the battery system 20, the second switch 40 is set to an ON state.

Meanwhile, if a blackout occurs in the grid 3, the second switch 40 is set to be an OFF state and the first switch 30 is set to an ON state. That is, the power from the power generating system 2 and/or the battery system 20 is supplied to the load 4 and simultaneously power supplied to the load 4 is prevented from flowing toward the grid 3. Thus, a single operation of the energy storage system 1 may be prevented, so that an accident in which an operator working on a power cable of the grid 3 receives an electric shock due to the power from the energy storage system 1 may be prevented.

The first switch 30 and the second switch 40 may use switching devices such as relays capable of enduring a large current.

The battery system 20 receives and stores power of the power generation system 2 and/or the grid 3, and supplies the stored power to the load 4 or the grid 3. The battery system 20 may include a part that stores the power and a part that controls and stores the part that stores the power. The battery system 20 will now be described in more detail with respect to FIG. 2.

Figure 2:
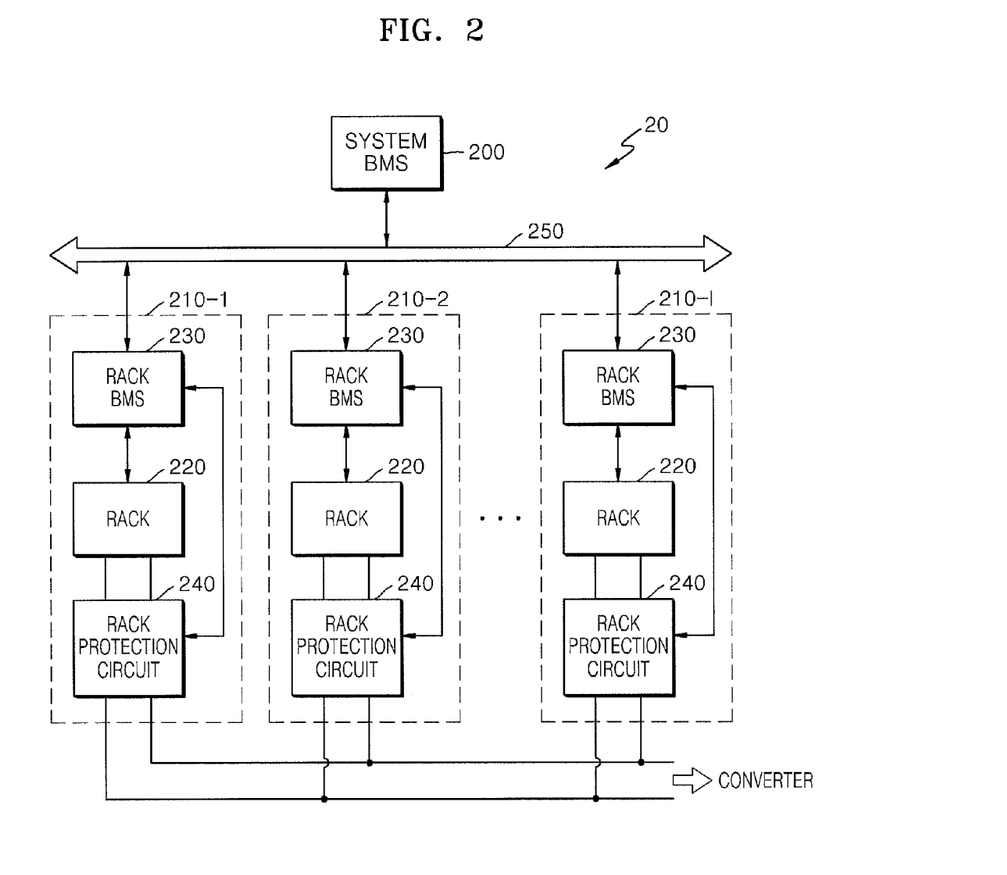
FIG. 2 is a block diagram illustrating a battery system according to an embodiment.

FIG. 2 is a block diagram illustrating the battery system 20 according to an embodiment. Referring to FIG. 2, the battery system 20 may include a plurality of battery racks 210-1~210-I, a system battery management system (BMS) 200, and a first communication channel 250 for wireless data communication.

The plurality of battery racks 210-1~210-I store power supplied from the outside, e.g. the power generation system 2 and/or the grid 3, and supplies the stored power to the grid 3 and/or the load 4. Each of the plurality of battery racks 210-1~210-I may include a rack 220, a rack BMS 230, and a rack protection circuit 240.

The racks 220 may include trays 222 that store the power. Charging and discharging operations of the racks 220 are controlled by the rack BMSs 230. The racks 220 may be connected in series or in parallel to each other according to required output voltages.

The rack BMSs 230 control the rack protection circuits 240 so as to control the charging and discharging operations of the racks 220. Also, the rack BMSs 230 monitor states of the racks 220, for example, a temperature, a voltage, a flowing current, etc. and transmits measured data to the system BMS 200.

The rack protection circuits 240 may block a power supply according to the control of the rack BMSs 230. Also, the rack protection circuits 240 may measure voltage and current of the racks 220 and transmit a measurement result to the rack BMSs 230.

The power output from the racks 220 may be supplied to the converter 14 through the rack protection circuits 240, and the power supplied from the outside to the converter 14 may be stored in the racks 220 through the rack protection circuits 240. Power lines extending from the rack protection circuits 240 may be connected to the converter 14 in parallel to each other. However, the present invention is not limited thereto. The power lines may be connected to the converter 14 in series or in a combination of series and parallel according to an amount of power output from the racks 220, and a level of an output voltage of the racks 220.

A first communication channel 250 transmits data or a command between the system BMS 200 and the rack BMSs 230. A communication protocol between the system BMS 200 and the rack BMSs 230 may use Zigbee communication. However, the present invention is not limited thereto. A near distance wireless network such as Bluetooth, ultra wide band (UWB), WiFi, etc. may be applied to a wireless communication protocol used to transmit the data or the command without limitation. The system BMS 200 and the rack BMSs 230 may be freely disposed within a predetermined distance of each other and use wireless communication, according to a wireless communication protocol.

For reference, Zigbee is referred to as a data communication protocol that operates in 868/915 MHz and 2.4 GHz bands based on IEEE 802.15.4 (low rate-wireless personal area network (LR-WPAN) PHY/MAC.

Figure 3:
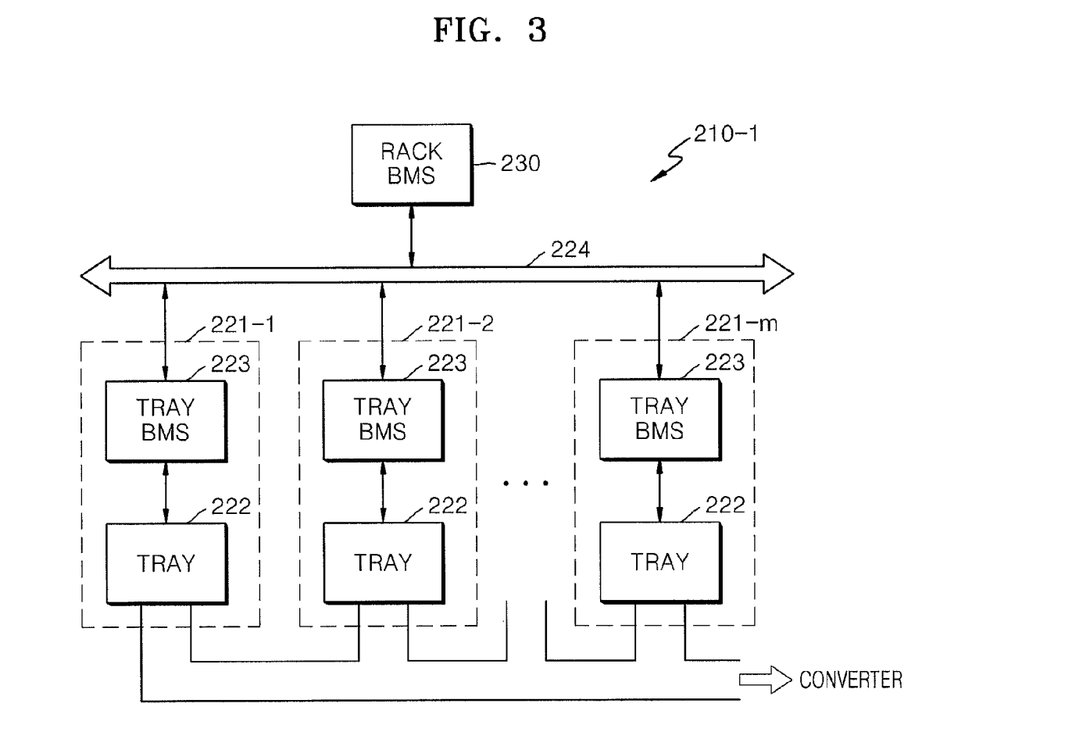
FIG. 3 is a block diagram illustrating a battery rack according to an embodiment.

The battery rack 210-1 is described in more detail.

FIG. 3 is a block diagram illustrating the battery rack 210-1 according to an embodiment. Referring to FIG. 3, the battery rack 210-1 may include a plurality of battery trays 221-1~221-m, the rack BMS 230, and a second communication channel 224 for data communication. Also, although the battery rack 210-1 may include the rack protection circuits 240, the rack protection circuits 240 are not shown in FIG. 3.

The plurality of battery trays 221-1~221-m are elements, such as lower elements, of the racks 220, store power, and supply the stored power to the grid 3, the load 4, etc. Each of the battery trays 221-1~221-m may include the tray 222 and a tray BMS 223.

The trays 222 store power and may include a battery cell as, for example, a lower element. The number of battery cells included in the trays 222 may be determined according to a required output voltage. Such a battery cell may use a variety of chargeable secondary batteries, such as a nickel-cadmium battery, a lead storage battery, a nickel metal hydride (NiMH) battery, a lithium ion battery, a lithium polymer battery, or the like.

Charging and discharging operations of the trays 222 may be controlled by the tray BMSs 223. Also, the plurality of trays 222 may be connected in series to each other to generate an output voltage for the racks 220. Power lines may extend from the trays 222 disposed at both ends from among the serially connected trays 222 and supply power to the converter 14 through the rack protection circuits 240.

The tray BMSs 223 control the charging and discharging operations of the tray 222. Also, the tray BMSs 223 monitor states of the trays 222, for example, a temperature, a voltage, a flowing current, etc. and transmit measured data to the rack BMSs 230.

The second communication channel 224 transmits data or commands between the rack BMS 230 and the tray BMSs 223. A communication protocol between the rack BMS 230 and the tray BMSs 223 may use Zigbee communication. However, the present invention is not limited thereto. Any wireless communication protocol used to transmit the data or the command may be applied.

Figure 4:
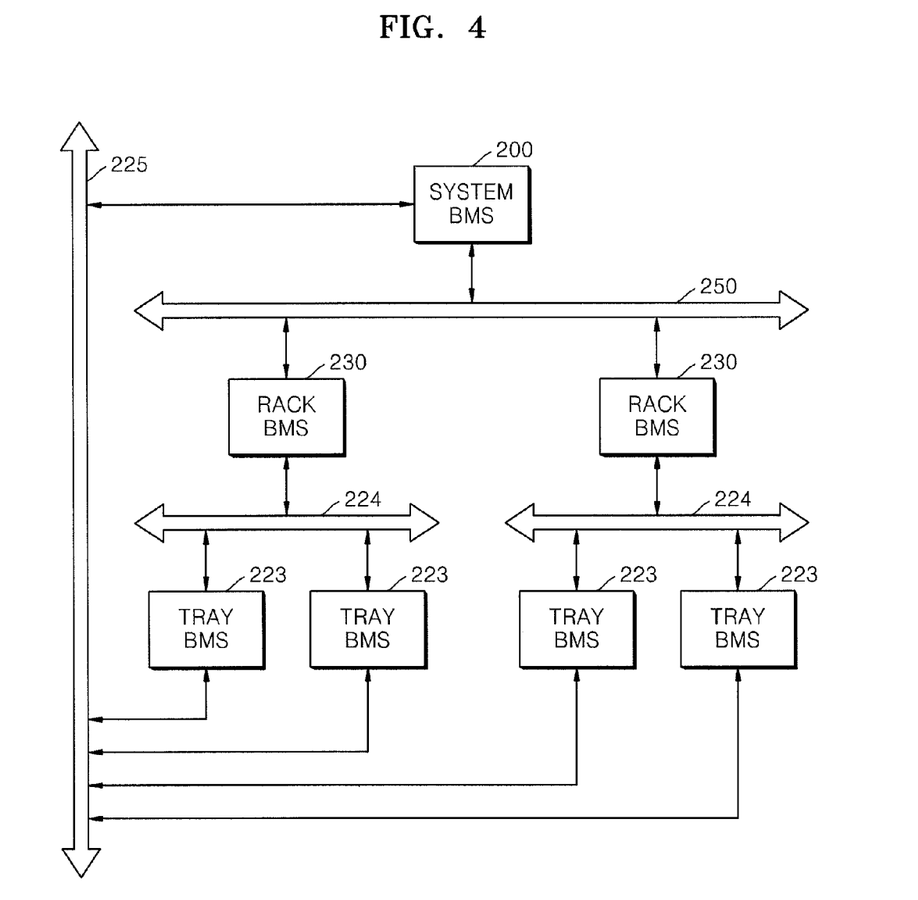
FIG. 4 illustrates a battery management system (BMS) having a hierarchical structure.

FIG. 4 illustrates a set of BMS having a hierarchical structure. Referring to FIG. 4, only the BMS described with reference to FIGS. 2 and 3 is illustrated as having the hierarchical structure. The plurality of rack BMSs 230 may be present as lower layers of the system BMS 200. The tray BMSs 223 may be present as lower layers of the rack BMSs 230. As described above, the first communication channel 250 that is a wireless communication channel is used between the system BMS 200 and the rack BMSs 230, and the second communication channel 224 is used between the rack BMSs 230 and the tray BMSs 223. In addition, referring to FIG. 4, a third communication channel 225 may be used between the system BMS 200 and the tray BMSs 223.

That is, according to an embodiment, wired or wireless communication may be possible between the system BMS 200 and the rack BMSs 230, and between the rack BMSs 230 and the tray BMSs 223, as well as direct wireless communication may be possible between the system BMS 200 and the tray BMSs 223 without an intermediate step. Although a case where the BMS has three layers, such as in FIG. 4, the number of BMS layers may be greater according to a complexity of a battery system. In a case where the BMS has three or more layers, a BMS of an upper layer and a BMS of a lower layer may directly perform wired or wireless communication with any or all of the lower layers.

Figure 5:
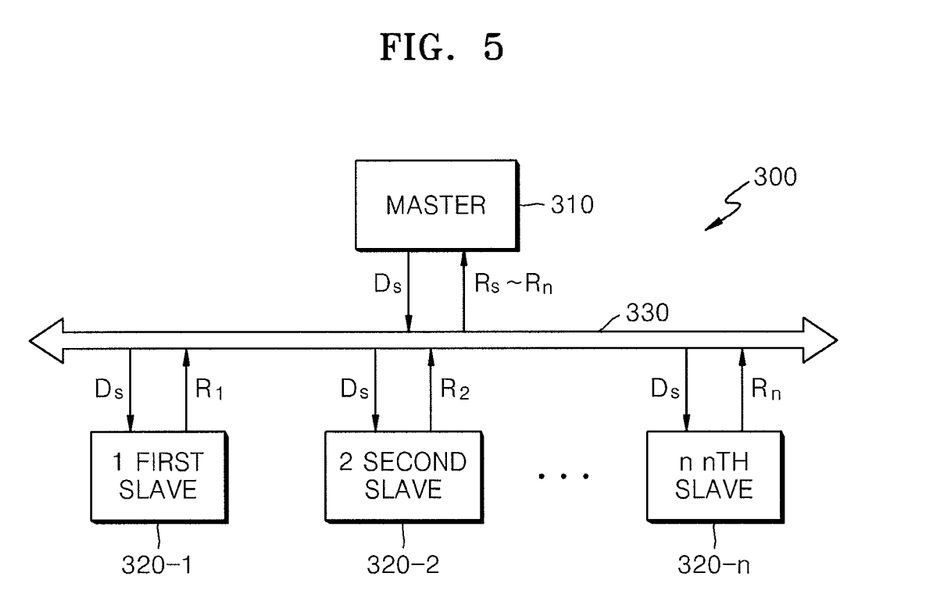
FIG. 5 is a block diagram illustrating a communication system having a master and slave structure according to an embodiment.

FIG. 5 is a block diagram illustrating a communication system 300 having a master and slave structure according to an embodiment. Referring to FIG. 5, the communication system 300 includes a master 310, a plurality of slaves 320-1~320-n, and a communication channel 330.

In this regard, the master 310 may correspond to the system BMS 200 of FIG. 4, and the slaves 320-1~320-n may correspond to the rack BMSs 230 of FIG. 4. Alternatively, the master 310 may correspond to the rack BMSs 230 of FIG. 4, and the slaves 320-1~320-n may correspond to the tray BMSs 223 of FIG. 4. Alternatively, the master 310 may correspond to the system BMS 200 of FIG. 4, and the slaves 320-1~320-n may correspond to the tray BMSs 223 of FIG. 4. That is, the master 310 corresponds to a BMS of an upper layer relative to the layer of the slaves, and the slaves 320-1~320-n correspond to a BMS of a lower layer relative to the layer of the master. The layers of master 310 and the slave 320 do not need to be directly adjacent to each other and the system BMS 200 may communicate through the tray BMSs 223 and the communication channel 330 without the rack BMSs 230. Also, in some embodiments, the slaves 320-1-320-n are not in the same layer.

The communication channel 330 includes, for example one or more of the first communication channel 250, the second communication channel 224, and the third communication channel 225 of FIG. 4. The communication channel 330 may be a wireless communication channel that uses Zigbee as a communication protocol but the present invention is not limited thereto. The communication channel 330 may use any wired or wireless communication protocol.

In this embodiment, communication channel 330 is wireless, and thus the master 310 and the slave 320 may freely communicate within a predetermined distance of each other without an electric wire irrespective of a location of the slave 320. That is, since the BMS of the upper layer and the BMS of the lower layer may not communicate with each other through the electric wire, a circuit of a battery is advantageously simplified compared to another wired communication method. In particular, in a case where the communication channel 330 uses a Zigbee protocol according to an embodiment, since free near distance wireless communication is possible within 50 meters, the system BMS 200, the rack BMSs 230, and the tray BMSs 223 may be freely disposed irrespective of the electric wire.

The master 310 transmits a request signal Ds to the slave 320 through the communication channel 330. The slaves 320-1~320-n transmit response signals R1-Rn based on the request signal Ds through the communication channel 330.

The request signal Ds is a signal from the BMS of the upper layer to obtain information regarding the BMS of the lower layer. For example, the system BMS 200 may generate the request signal Ds that requests voltage information from the tray BMSs 223 and may transmit the request signal Ds to the communication network 330 so as to obtain voltage states of the trays 222. Each of the tray BMSs 223 that receives the request signal Ds that requests the voltage information measures a voltage of each of the trays 222 and transmits the measured voltage to the communication network 330 as response signals R1~Rn.

When the master 310 transmits the request signal Ds to the slaves 320-1~320-n through the communication network 330, the request signal Ds transferred to each of the slaves 320-1~320-n may be a synchronized signal. That is, the master 310 may simultaneously or substantially simultaneously transfer the request signal Ds to the slaves 320-1~320-n. Thus, the response signals R1~Rn generated in response to the request signal Ds includes measurement data information obtained by simultaneously or substantially simultaneously measuring states of the slaves 320-1~320-n.

The request signal Ds and the response signals R1-Rn may be encoded and transferred. The master 310 includes a seed generated based on a random number when the request signal Ds is generated. The slaves 320-1~320-n that receive the request signal Ds including the seed generate a key value corresponding to each seed and include the key value in the response signals R1~Rn. The master 310 determines whether the key value corresponding to the seed is correct by referring to the key values included in the response signals R1-Rn and authenticates whether a corresponding slave is authorized to communicate.

Figure 6:
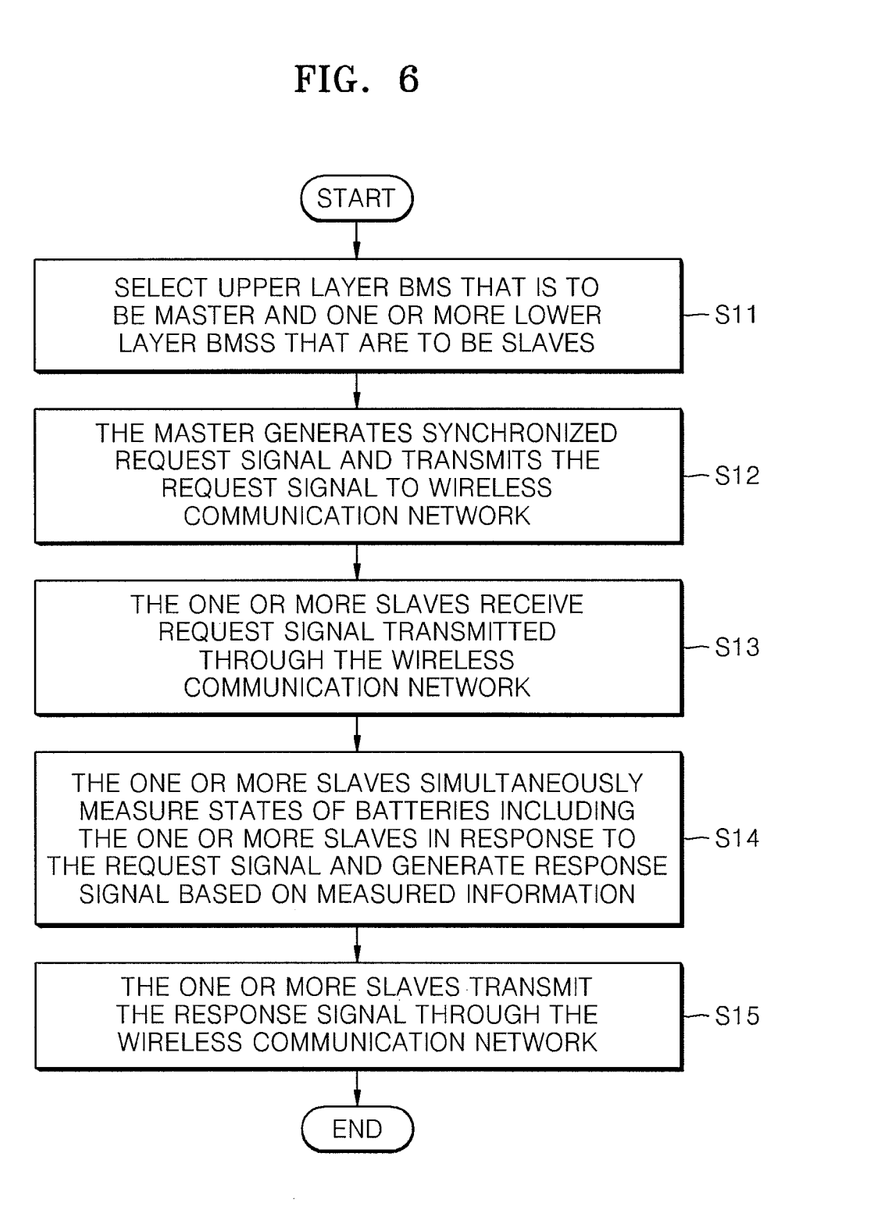
FIG. 6 is a flowchart of communication between BMSs according to an embodiment.

FIG. 6 is a flowchart of communication between BMSs according to an embodiment.

Referring to FIG. 6, a BMS of an upper layer that is to be a master and one or more BMSs of a lower layer that are to be slaves are selected (operation S11). Next, the master generates a request signal and transmits the request signal to a wireless communication network (operation S12). Next, the one or more slaves receive the request signal transmitted through the wireless communication network (operation S13). Next, the one or more slaves simultaneously or substantially simultaneously measure states of batteries including the slaves in response to the request signal and generate response signals based on measurement information (operation S14). Next, the one or more slaves transmit the response signals through the wireless communication network (operation S15).

The particular implementations shown and described herein are illustrative examples of the invention and are not intended to otherwise limit the scope of the invention. For the sake of brevity, conventional electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical implementation. Moreover, no item or component is essential to the practice of the invention unless the element is specifically described as "essential" or "critical".

The use of the terms "a" and "an" and "the" and similar referents in the context of describing the invention (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein can be performed in any suitable order unless otherwise indicated herein or otherwise clearly contradicted by context. The present invention is not limited to the described order of the steps. The use of any and all examples, or exemplary language (e.g., "such as") provided herein, is intended merely to better illuminate the invention and does not pose a limitation on the scope of the invention unless otherwise stated. Numerous modifications and adaptations will be readily apparent to those skilled in this art without departing from the spirit and scope of the present invention.

As described above, according to the one or more of the above embodiments of the present invention, information may be transmitted and received between BMSs through wireless communication, and thus BMSs may be freely disposed within a predetermined distance of each other without limitation.

It should be understood that the exemplary embodiments described herein should be considered in a descriptive sense only and not for purposes of limitation. Descriptions of features or aspects within each embodiment should typically be considered as available for other similar features or aspects in other embodiments.

What is claimed is:

1. A battery system comprising a battery management system (BMS) having a hierarchical structure comprising an upper layer BMS and a lower layer BMS, wherein the upper layer BMS is a master and the lower layer BMS is a slave, wherein the master transmits a request signal to the slave wirelessly, and wherein the slave transmits a response signal based on the request signal wirelessly to the master, wherein the structure of the BMS includes an intermediate layer BMS, which is between the upper layer BMS and the lower layer BMS, and wherein the request signal is transmitted from the master to the slave without use of the intermediate layer BMS, and the response signal is transmitted from the slave to the master without use of the intermediate layer BMS.

2. The battery system of claim 1, wherein wireless communication is Zigbee wireless communication.

3. The battery system of claim 1, wherein the upper layer BMS is a system BMS, the intermediate layer BMS is a rack BMS, and the lower layer BMS is a tray BMS.

4. The battery system of claim 1, wherein the master and the slave are disposed within a distance of less than 50 meters therebetween.

5. The battery system of claim 1, wherein the request signal and the response signal are encoded.

6. The battery system of claim 1, wherein the master includes a seed generated based on a random number in the request signal, the slave generates a key value corresponding to the seed and includes the key value in the response signal, and the master authenticates the slave by referring to the key value.

7. A battery system comprising a battery management system (BMS) having a hierarchical structure comprising an upper layer BMS and a plurality of lower layer BMSs, wherein the upper layer BMS is a master and one or more of the lower layer BMSs are slaves, wherein the master is configured to substantially simultaneously transmit a request signal to the slaves wirelessly, and wherein the slaves are configured to transmit response signals based on the request signal wirelessly, wherein the structure of the BMS includes an intermediate layer BMS, which is between the upper layer BMS and the lower layer BMS, and wherein the request signal is transmitted from the master to the slaves without use of the intermediate layer BMS, and the response signals are transmitted from the slaves to the master without use of the intermediate layer BMS.

8. The battery system of claim 7, wherein the master is configured to transmit the request signal to the slaves by using a synchronized signal.

9. The battery system of claim 7, wherein the response signals comprise information regarding substantially simultaneously measured states of the slaves.

10. The battery system of claim 7, wherein wireless communication is Zigbee wireless communication.

11. The battery system of claim 7, wherein the first layer is a system BMS, the second layer is a rack BMS, and the third layer is a tray BMS.

12. The battery system of claim 7, wherein the master and the slaves are disposed within a distance of less than 50 meters therebetween.

13. The battery system of claim 7, wherein the request signal and the response signals are encoded.

14. The battery system of claim 7, wherein the master includes seeds generated based on a random number in the request signal, the slaves generate key values corresponding to the seeds and include the key values in the response signals, and the master authenticates the slaves by referring to the key values.

15. An energy storage system comprising:
a power conversion unit configured to convert a voltage generated by a power generation system into a DC voltage;
a bidirectional inverter configured to convert the DC voltage into an AC voltage and to convert another AC voltage into a DC voltage;
a battery system comprising a battery module including a set of batteries having a hierarchical structure and a set of BMSs configured to control charging and discharging of the battery module and having a hierarchical structure corresponding to the hierarchical structure of the batteries;
an integrated controller for charging the batteries, discharging the batteries, and controlling the power conversion unit, the bidirectional inverters, a bidirectional inverter, and the battery system so as to supply power to a load and a grid,
wherein an upper layer BMS is a master and a lower layer BMS is slave, wherein the master is configured to transmit a Zigbee based wireless request signal to the slave, and the slave is configured to transmit a Zigbee based wireless response signal based on the Zigbee based wireless request signal,
wherein the structure of the BMS includes an intermediate layer BMS, which is between the upper layer BMS and the lower layer BMS, and wherein the request signal is transmitted from the master to the slave without the intermediate layer BMS, and the response signal is transmitted from the slave to the master without the intermediate layer BMS.

16. The energy storage system of claim 15, wherein the upper layer BMS is a system BMS, the intermediate layer BMS is a rack BMS, and the lower layer BMS is a tray BMS.

17. The energy storage system of claim 15, wherein the master and the slave are disposed within a distance of less than 50 meters therebetween.

* * * * *